United States Patent
Kwon et al.

(10) Patent No.: US 9,830,260 B2
(45) Date of Patent: Nov. 28, 2017

(54) METHOD FOR MAPPING PAGE ADDRESS BASED ON FLASH MEMORY AND SYSTEM THEREFOR

(71) Applicant: AJOU UNIVERSITY INDUSTRY-ACADEMIC COOPERATION FOUNDATION, Suwon-si, Gyeonggi-Do (KR)

(72) Inventors: Se Jin Kwon, Seoul (KR); Tae Sun Chung, Suwon-si (KR); Jae Kwang Ban, Seoul (KR); Ho Young Jung, Uiseong-gun (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 14/779,954

(22) PCT Filed: Dec. 31, 2013

(86) PCT No.: PCT/KR2013/012429
§ 371 (c)(1),
(2) Date: Sep. 24, 2015

(87) PCT Pub. No.: WO2014/157817
PCT Pub. Date: Oct. 2, 2014

(65) Prior Publication Data
US 2016/0048448 A1 Feb. 18, 2016

(30) Foreign Application Priority Data
Mar. 25, 2013 (KR) .......................... 10-2013-0031375

(51) Int. Cl.
G06F 12/02 (2006.01)

(52) U.S. Cl.
CPC ...... *G06F 12/0292* (2013.01); *G06F 12/0246* (2013.01); *G06F 2212/1016* (2013.01);
(Continued)

(58) Field of Classification Search
CPC .................... G06F 12/0292; G06F 12/0246
(Continued)

(56) References Cited

U.S. PATENT DOCUMENTS 8,019,925 B1 * 9/2011 Vogan .................... G06F 12/04
711/202
9,697,116 B2 * 7/2017 Kim .................... G06F 12/0246
(Continued)

FOREIGN PATENT DOCUMENTS

KR 2003-0095820 A 12/2003
KR 20030095820 A * 12/2003
(Continued)

OTHER PUBLICATIONS

International Search Report dated Mar. 18, 2014, issued to International Application No. PCT/KR2013/012429.

*Primary Examiner* — Pierre-Michel Bataille
(74) *Attorney, Agent, or Firm* — Stein IP, LLC

(57) ABSTRACT

The present invention relates to a method for a page-level address mapping based on flash memory and a system thereof. A method for a page-level address mapping based on a flash memory according to an embodiment of the present invention includes the steps of: receiving a write operation from a file system; generating condensed mapping information using a size of data information of the write operation and a start logical address of sequentially allocated logical addresses of the write operation; and storing the condensed mapping information as a first mapping table in a memory of a flash translation.

14 Claims, 7 Drawing Sheets

(52) U.S. Cl.
CPC .............. *G06F 2212/2022* (2013.01); *G06F 2212/7201* (2013.01)

(58) Field of Classification Search
USPC .................................................. 711/202, 203
See application file for complete search history.

(56) References Cited

U.S. PATENT DOCUMENTS

| | | | | |
|---|---|---|---|---|
| 2005/0144368 A1* | 6/2005 | Chung | ............... | G06F 12/0246 711/103 |
| 2010/0125694 A1* | 5/2010 | Choi | .................. | G06F 12/0246 711/1 |
| 2010/0257309 A1* | 10/2010 | Barsky | ............... | G06F 12/0246 711/103 |
| 2010/0332732 A1 | 12/2010 | Chiang et al. | ................ | 711/103 |
| 2012/0110239 A1* | 5/2012 | Goss | .................. | G06F 12/0246 711/103 |
| 2012/0278560 A1* | 11/2012 | Benzion | ............. | G06F 12/0873 711/137 |
| 2014/0164687 A1 | 6/2014 | Kwon et al. | ................... | 711/103 |
| 2014/0164730 A1* | 6/2014 | Gold | .................... | G06F 3/0608 711/171 |
| 2015/0081961 A1 | 3/2015 | Kwon et al. | ................... | 711/103 |
| 2015/0205525 A1* | 7/2015 | Chiu | ...................... | G06F 3/061 711/162 |

FOREIGN PATENT DOCUMENTS

| | | |
|---|---|---|
| KR | 10-0965051 B1 | 6/2010 |
| KR | 10-2012-0037218 A | 4/2012 |
| KR | 10-2012-0074707 A | 7/2012 |
| KR | 20120074707 A * | 7/2012 |
| KR | 10-1191650 B1 | 10/2012 |
| KR | 10-1319589 B1 | 10/2013 |

* cited by examiner

METHOD FOR MAPPING PAGE ADDRESS BASED ON FLASH MEMORY AND SYSTEM THEREFOR

CROSS-REFERENCE TO RELATED APPLICATIONS

This application is a national stage of International Application No. PCT/KR2013/012429, filed Dec. 31, 2013, which claims the benefit of priority to Korean Application No. 10-2013-0031375, filed Mar. 25, 2013, in the Korean Intellectual Property Office, the disclosures of which are incorporated herein by reference.

TECHNICAL FIELD

The present invention relates to a method and system for page-level address mapping based on flash memory. More particularly, the present invention relates to a system and method for improving performance when a system is being booted.

BACKGROUND ART

A Flash Translation Layer (FTL) is present between a file system and flash memory in order to perform the file system's requirement for accessing a system based on NAND flash memory. Because a general file system is designed based on a hard disk, the cost of a read operation is the same as the cost of a write operation and data can be overwritten. However, in the case of a flash memory-based system, the costs of a read operation, a write operation, and an erase operation are different, data cannot be overwritten, and flash memory has erase-before-write constraints. Therefore, for smooth operations when an Operating System (OS) or a file system accesses a flash memory-based system, a flash translation layer executes functions of mapping addresses between flash memory and the OS or the file system and maintaining the mapping information.

An FTL translates a request for a logical sector from a file system into a physical page of flash memory. If updates occur in the flash memory, the FTL writes data for the requested sector to a newly allocated block, and then modifies mapping information of a mapping table. Also, the FTL provides a wear-leveling function for a limited block erase count of flash memory.

As mapping methods for FTL algorithms, there are page mapping, block mapping, and hybrid mapping.

Page mapping maintains mapping information for the whole area of flash memory by a page unit. A page mapping table is in memory (DRAM or SDRAM), or a part of the page mapping table may be cached in the memory. The page mapping is advantageous in writing data to flash memory through a random write access pattern, but has a disadvantage in that it requires much memory for the page mapping table.

Block mapping requires a small size for mapping information, but when write operations with a fixed offset occur frequently in response to repeated requests, performance may be degraded because of the increased number of merge operations.

Hybrid mapping considers the advantages and disadvantages of the two mapping methods mentioned above. Hybrid mapping is flexible in a random write access pattern as the size of a page mapping area increases, but requires cost for searching a hybrid area when reading or writing the mapping information is requested. Also, time overhead occurs in finding an offset in a block. Therefore, the existing flash translation layer may degrade the performance of a system.

To solve such problems, Korean Patent Application Publication No. 10-2012-0074707, titled "Flash memory based storage and method for address mapping and data allocation thereof", discloses a method for effectively managing address mapping and data page allocation for a storage device using flash memory.

The above conventional art applies different address mapping methods according to data write access patterns, and differently allocates the physical location of flash memory according to the write patterns, whereby the cost for garbage collection in a data area is reduced and the life of flash memory may be extended.

However, in the case of the above conventional art, the size of a page mapping table is large because it writes addresses for all pages. Accordingly, many read operations are required for finding mapping information when a main computing system is booted, thus the performance of flash memory is degraded.

Therefore, required is a technique for improving system boot performance by decreasing the number of read operations by reducing the size of mapping information and the size of a page mapping table.

SUMMARY OF THE DISCLOSURE

An object of the present invention is to condense mapping information concerning a write operation by using the sequential features of logical addresses and a data size.

Another object of the present invention is to decrease the number of read operations by storing a page mapping table of which the size is reduced in DRAM rather than simply storing a page mapping table remaining intact in DRAM.

Also, the present invention intends to improve the boot performance of a flash memory-based system by reducing time that it takes to read booting information by storing condensed mapping information in memory of FTL, such as DRAM and/or SRAM.

To accomplish the above objects, a system for a page-level address mapping based on flash memory, according to an embodiment of the present invention, may include a processor and a FTL memory (memory within a flash translation layer). The processor may include a write operation reception unit, a condensed mapping information generation unit, a mapping information storage management unit, a read operation reception unit, a search unit, a calculation unit, and a read operation unit.

Also, a system for a page-level address mapping based on flash memory, according to another embodiment of the present invention, may include a processor. The processor may include a mapping information querying unit, a detection unit, and a mapping information management unit.

The write operation reception unit receives a write operation from a file system, and the condensed mapping information generation unit generates condensed mapping information, using the data size of the write operation and the start logical address of sequentially allocated logical addresses of the write operation.

The FTL memory stores the condensed mapping information as an FTL mapping table. Based on the FTL mapping table, the mapping information storage management unit may store a flash memory mapping table including the start logical address, a start physical address corresponding to the start logical address, and the data size of the write operation, calculated by a page unit, in the system area of the flash memory. In this case, the mapping information storage management unit may store the condensed form of flash memory mapping table in the system area of the flash memory. Conversely, the flash memory mapping table may be reconstructed into a table having mapping information for each page, and the reconstructed table may be stored in the system area of the flash memory.

Also, using the FTL mapping table, the mapping information storage management unit may store a flash memory mapping table including one-to-one mapping information between logical page addresses and physical page addresses in the system area of the flash memory.

The read operation reception unit receives a read operation from the file system, and the search unit searches the FTL mapping table for a start logical address, which is identical to the logical address requested by the read operation or is the closest to and smaller than the logical address requested by the read operation. The calculation unit calculates a physical address corresponding to the read operation using the found start logical address and the logical address requested by the read operation. The read operation unit reads data stored at the calculated physical address of the flash memory.

The mapping information querying unit may query the flash memory mapping table for mapping information between logical addresses and physical addresses by executing a read operation on the system area of the flash memory when a main computing system is booted, and the detection unit detects sequential logical addresses and sequential physical addresses corresponding to the sequential logical addresses, based on the found mapping information.

Using the sizes indicated by the detected sequential logical addresses and the detected sequential physical addresses, the mapping information management unit condenses the mapping information of the flash memory, which includes a start logical address, a start physical address corresponding to the start logical address, and the size of sequential data; and then stores the condensed information in the memory of the flash translation layer.

In this case, the mapping information management unit determines whether the logical addresses and physical addresses of the current entry and the next entry of the flash memory mapping table are sequential. If the logical addresses and physical addresses of the current entry and the next entry are sequential, the current entry and the next entry are condensed into a single entry, and the mapping information generated by the condensing process may be stored in the memory of the flash translation layer.

Meanwhile, a flash memory-based page-level address mapping method according to an embodiment of the present invention includes a step for receiving a write operation, a step for generating condensed mapping information, a step for storing mapping information in the memory of a flash translation layer, and a step for storing mapping information in the system area of flash memory.

At the step for receiving a write operation, a write operation is received from a file system. At the step for generating condensed mapping information, condensed mapping information is generated using the data size of the write operation and the start logical address of sequentially allocated logical addresses of the write operation.

At the step for storing mapping information in the memory of a flash translation layer, the condensed mapping information including the start logical address, a start physical address corresponding to the start logical address, and the data size of the write operation, calculated by a page unit, are stored as an FTL mapping table in the memory of the flash translation layer.

At the step for storing mapping information in the system area of the flash memory, based on the FTL mapping table, a flash memory mapping table including the start logical address, a start physical address corresponding to the start logical address, and the data size of the write operation, calculated by a page unit, is stored in the flash memory.

Also, at the step for storing mapping information in the system area of the flash memory, a flash memory mapping table including one-to-one mapping information between logical page addresses and physical page addresses may be stored in the flash memory, based on the FTL mapping table.

Also, the flash memory-based page-level address mapping method according to an embodiment of the present invention further includes: a step for receiving a read operation from the file system; a step for searching the FTL mapping table for a start logical address, which is identical to the logical address requested by the read operation or is the closest to and smaller than the logical address requested by the read operation; a step for calculating a physical address corresponding to the read operation, using the found start logical address and the logical address requested by the read operation; and a step for reading data stored at the calculated physical address of the flash memory.

Meanwhile, a flash memory-based page-level address mapping method according to an embodiment of the present invention includes: a step for querying mapping information between the logical addresses and the physical addresses stored in the flash memory by executing a read operation on the system area of the flash memory when a main computing system is booted; a step for detecting sequential logical addresses and sequential physical addresses corresponding to the sequential logical addresses, based on the found mapping information; and a step for storing mapping information including a start logical address, a start physical address corresponding to the start logical address, and the size of sequential data in the memory of the flash translation layer, the mapping information being condensed using the sizes indicated by the detected sequential logical addresses and the detected sequential physical addresses.

Also, at the step for detecting the sequential physical addresses, whether the logical addresses and physical addresses of the current entry and the next entry are sequential is determined using the mapping information retrieved from the flash memory mapping table of the flash memory. At the step for storing mapping information in the memory of the flash translation layer, if the logical addresses and physical addresses of the current entry and the next entry are sequential, the FTL mapping information in which the current entry and the next entry are condensed into a single entry is stored in the memory of the flash translation layer.

The present invention has an effect of condensing mapping information concerning a write operation by using the sequential features of logical addresses and a data size.

The present invention has an effect of decreasing the number of read operations by storing a page mapping table of which the size is reduced in DRAM rather than merely storing a page mapping table remaining intact in DRAM.

The present invention has an effect of reducing the size of mapping information by condensing logical addresses by a page unit and mapping information into information having a form of 'a start logical address, a start physical address, and a data size calculated by a page unit' and by storing the condensed information in flash memory.

Also, the present invention has an effect of reducing the size of a page mapping table by using fast wake-up operation. The present invention may improve boot performance of a flash memory-based system. Also, because the present invention may improve the boot performance of a flash memory-based system, it may be applied to various smart devices.

DETAILED DESCRIPTION OF THE DISCLOSURE

Figure 1:
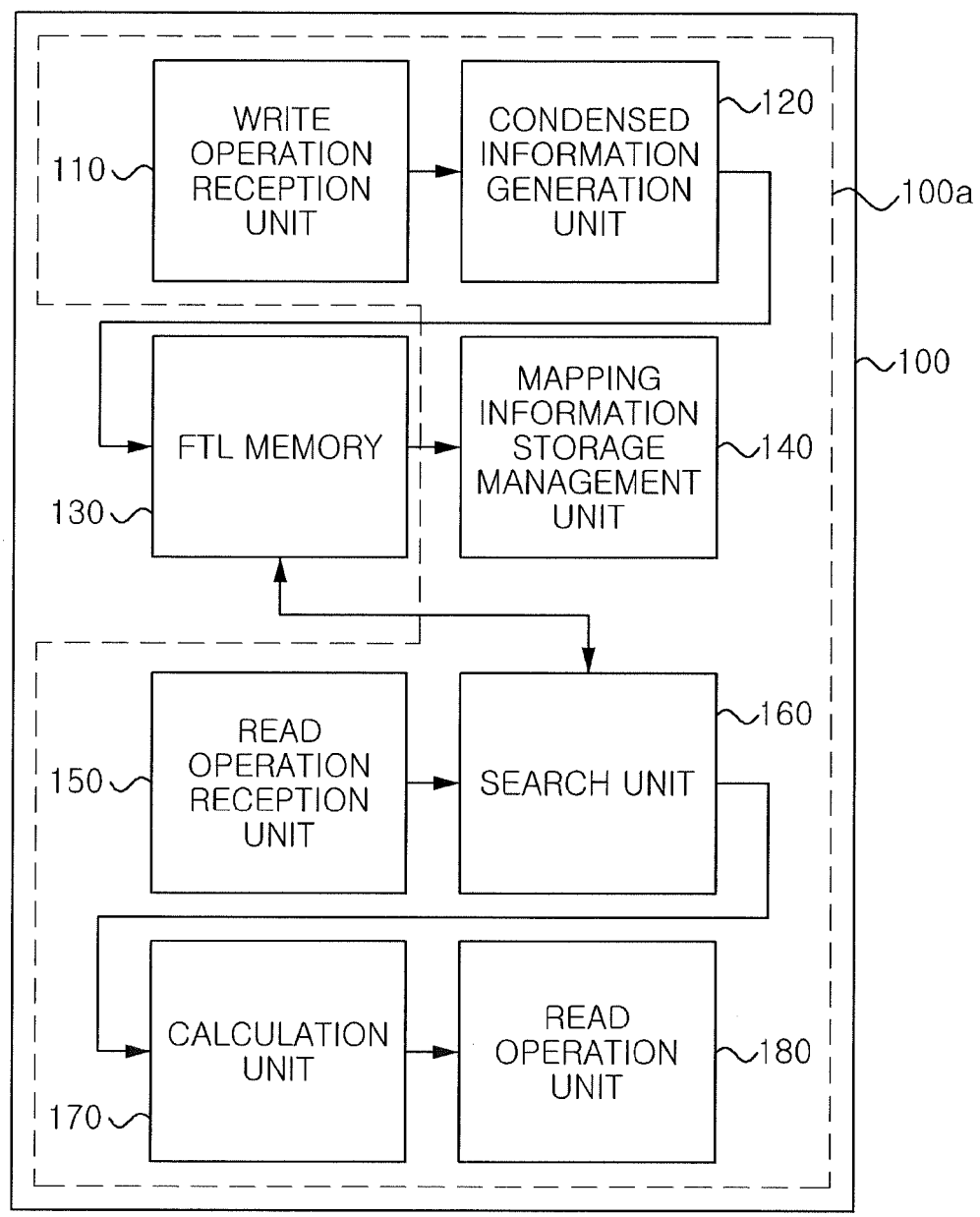
FIG. 1 is a view illustrating the schematic configuration of a flash memory-based page-level address mapping system of the present invention.

To accomplish the above objects, a flash memory-based page-level address mapping system according to an embodiment of the present invention may include a processor and a FTL memory (memory within a flash translation layer). The processor may include a write operation reception unit, a condensed mapping information generation unit, a mapping information storage management unit, a read operation reception unit, a search unit, a calculation unit, and a read operation unit.

Also, a flash memory-based page-level address mapping system according to another embodiment of the present invention may include a processor, which includes mapping information querying unit, a detection unit, and a mapping information management unit.

The write operation reception unit receives a write operation from a file system, and the condensed mapping information generation unit generates condensed mapping information, using the data size of the write operation and the start logical address of sequentially allocated logical addresses of the write operation.

The FTL memory stores the condensed mapping information as an FTL mapping table. Based on the FTL mapping table, the mapping information storage management unit may store a flash memory mapping table including the start logical address, a start physical address corresponding to the start logical address, and the data size of the write operation, calculated by a page unit, in the system area of the flash memory. In this case, the mapping information storage management unit may store the condensed form of flash memory mapping table in the system area of the flash memory. Conversely, the flash memory mapping table may be reconstructed into a table having mapping information for each page, and the reconstructed table may be stored in the system area of the flash memory.

Also, using the FTL mapping table, the mapping information storage management unit may store a flash memory mapping table including one-to-one mapping information between logical page addresses and physical page addresses in the system area of the flash memory.

The read operation reception unit receives a read operation from the file system, and the search unit searches the FTL mapping table for a start logical address, which is identical to the logical address requested by the read operation or is the closest to and smaller than the logical address requested by the read operation. The calculation unit calculates a physical address corresponding to the read operation using the found start logical address and the logical address requested by the read operation. The read operation unit reads data stored at the calculated physical address of the flash memory.

The mapping information querying unit may query the flash memory mapping table for mapping information between logical addresses and physical addresses by executing a read operation on the system area of the flash memory when a main computing system is booted, and the detection unit detects sequential logical addresses and sequential physical addresses corresponding to the sequential logical addresses, based on the found mapping information.

Using the sizes indicated by the detected sequential logical addresses and the detected sequential physical addresses, the mapping information management unit condenses the mapping information of the flash memory, which includes a start logical address, a start physical address corresponding to the start logical address, and the size of sequential data; and then stores the condensed information in the memory of the flash translation layer.

In this case, the mapping information management unit determines whether the logical addresses and physical addresses of the current entry and the next entry of the flash memory mapping table are sequential. If the logical addresses and physical addresses of the current entry and the next entry are sequential, the current entry and the next entry are condensed into a single entry, and the mapping information generated by the condensing process may be stored in the memory of the flash translation layer.

Meanwhile, a flash memory-based page-level address mapping method according to an embodiment of the present invention includes a step for receiving a write operation, a step for generating condensed mapping information, a step for storing mapping information in the memory of a flash translation layer, and a step for storing mapping information in the system area of flash memory.

At the step for receiving a write operation, a write operation is received from a file system. At the step for generating condensed mapping information, condensed mapping information is generated using the data size of the write operation and the start logical address of sequentially allocated logical addresses of the write operation.

At the step for storing mapping information in the memory of a flash translation layer, the condensed mapping information including the start logical address, a start physical address corresponding to the start logical address, and the data size of the write operation, calculated by a page unit, are stored as an FTL mapping table in the memory of the flash translation layer.

At the step for storing mapping information in the system area of the flash memory, based on the FTL mapping table, a flash memory mapping table including the start logical address, a start physical address corresponding to the start logical address, and the data size of the write operation, calculated by a page unit, is stored in the flash memory.

Also, at the step for storing mapping information in the system area of the flash memory, a flash memory mapping table including one-to-one mapping information between logical page addresses and physical page addresses may be stored in the flash memory, based on the FTL mapping table.

Also, the flash memory-based page-level address mapping method according to an embodiment of the present invention further includes: a step for receiving a read operation from the file system; a step for searching the FTL mapping table for a start logical address, which is identical to the logical address requested by the read operation or is the closest to and smaller than the logical address requested by the read operation; a step for calculating a physical address corresponding to the read operation, using the found start logical address and the logical address requested by the read operation; and a step for reading data stored at the calculated physical address of the flash memory.

Meanwhile, the flash memory-based page-level address mapping method according to an embodiment of the present invention includes: a step for querying for mapping information between the logical addresses and the physical addresses stored in the flash memory by executing a read operation on the system area of the flash memory when a main computing system is booted; a step for detecting sequential logical addresses and sequential physical addresses corresponding to the sequential logical addresses, based on the found mapping information; and a step for storing mapping information including a start logical address, a start physical address corresponding to the start logical address, and the size of sequential data in the memory of the flash translation layer, the mapping information being condensed using the sizes indicated by the detected sequential logical addresses and the detected sequential physical addresses.

Also, at the step for detecting the sequential physical addresses, whether the logical addresses and physical addresses of the current entry and the next entry are sequential is determined using the mapping information retrieved from the flash memory mapping table of the flash memory. At the step for storing mapping information in the memory of the flash translation layer, if the logical addresses and physical addresses of the current entry and the next entry are sequential, the FTL mapping information in which the current entry and the next entry are condensed into a single entry is stored in the memory of the flash translation layer.

Hereinbelow, preferred embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted. Also, in the following description of embodiments of the present invention, specific numerical values correspond merely to embodiments.

A Flash Translation Layer (FTL) is present between a file system and flash memory in order to perform the file system's requirement for accessing a system based on NAND flash memory, and the FTL includes address mapping methods for effectively managing information stored in the flash memory. Conventional address mapping methods are categorized into a page mapping method and a block mapping method.

The data stored in flash memory may be separated into attribute data and user data. In the case of a write operation relevant to the attribute data, the data size is as small as 1, 2, 4, and 8 sectors, and logical addresses for the attribute data are randomly allocated. Conversely, in the case of a write operation relevant to the user data, the data size is as large as 32, 64, and 128 sectors, and logical addresses are sequentially allocated.

Meanwhile, though the page mapping method is widely researched as flash memory recently uses multi-channel access, it is hard to find a technique for solving a disadvantage that the size of a page mapping table is large because the page mapping table writes addresses for all pages.

The size of a page mapping table may largely affect performance because many read operations are executed in order to search for mapping information when a main computing system is booted. Therefore, using the fact that the size of user data is large and logical addresses for the user data are sequentially allocated, the present invention generates condensed mapping information including only a start logical address, a start physical address, and the data size, unlike the conventional page address mapping in which all the relevant page mapping information is written. A detailed description will be described later with reference to the drawings.

Generally, a page mapping table is stored in a specific area (system area) of flash memory before system power is turned off. Then, when the main computing system is booted, a read operation is executed on the specific area (system area) of the flash memory, whereby the page mapping table is loaded to DRAM. The present invention discloses a system and method in which an FTL mapping table having the reduced size of mapping information is generated and then stored in the system area of flash memory after a write operation is received from a file system, the mapping information stored in the system area of the flash memory is read when a main computing system is booted, and mapping information, which is further condensed based on the stored mapping information, is stored in the memory of the FTL.

FIG. 1 is a view illustrating the schematic configuration of a flash memory-based page-level address mapping system of the present invention.

Referring to FIG. 1, a flash memory-based page-level address mapping system 100 of the present invention includes a processor 100a and a FTL memory 130. The processor 100a may include a write operation reception unit 110, a condensed mapping information generation unit 120, a mapping information storage management unit 140, a read operation reception unit 150, a search unit 160, a calculation unit 170, and a read operation unit 180.

The write operation reception unit 110 receives a write operation from a file system.

The condensed mapping information generation unit 120 generates condensed mapping information using both the data size of the write operation received by the write operation reception unit 110 and the start logical address of sequentially allocated logical addresses of the write operation. The condensed mapping information is generated using the start logical address, a start physical address corresponding to the start logical address, and the data size of the write operation, which is calculated by a page unit.

The FTL memory 130 stores therein the condensed mapping information, generated by the condensed mapping information generation unit 120, as an FTL mapping table. The FTL memory 130 is present on the memory of a flash translation layer, such as DRAM. However, the FTL memory 130 is not necessarily configured as DRAM or SRAM, and any memory device capable of random access and fast read/write operations compared to flash memory may function as the FTL memory 130.

The mapping information storage management unit 140 stores a flash memory mapping table, which is generated based on the FTL mapping table stored in the FTL memory 130.

In this case, if the condensed mapping information of the FTL mapping table is stored intactly in the flash memory, the mapping information of the flash memory mapping table contains the start logical address, the start physical address corresponding to the start logical address, and the data size of the write operation, calculated by a page unit.

Otherwise, if the condensed mapping information of the FTL mapping table is reconstructed and then stored in the flash memory, the mapping information of the flash memory mapping table contains one-to-one page mapping information between logical page addresses and physical page addresses. The mapping information storage management unit 140 manages the mapping information stored in the system area of the flash memory.

The read operation reception unit 150 receives a read operation from the file system, and the search unit 160 searches the FTL mapping table for a start logical address, which is identical to a logical address requested by the read operation or is the closest to and smaller than the logical address requested by the read operation.

The calculation unit 170 calculates a physical address corresponding to the read operation, using the start logical address found by the search unit 160 and the logical address requested by the read operation reception unit 150. The method for calculating the physical address will be described in detail later.

The read operation unit 180 reads data stored at the physical address calculated by the calculation unit 170.

Figure 2:
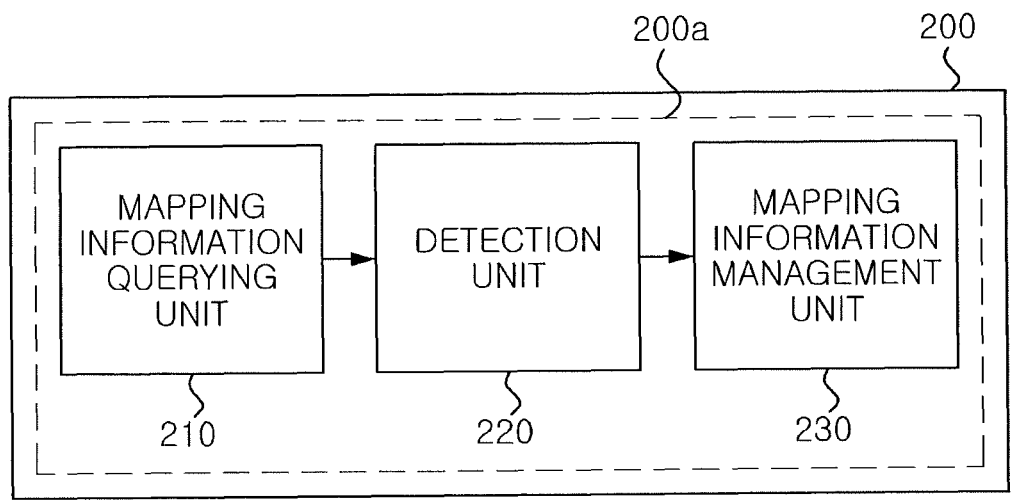
FIG. 2 is a view illustrating the schematic configuration of a flash memory-based page-level address mapping system of the present invention when the main computing system is booted.

FIG. 2 is a view illustrating the schematic configuration of a flash memory-based page-level address mapping system of the present invention when a main computing system is booted.

Referring to FIG. 2, when the main computing system (not shown) is booted, a flash memory-based page-level address mapping system 200 of the present invention includes a processor 200a. The processor 200a includes a mapping information querying unit 210, a detection unit 220, and a mapping information management unit 230.

The mapping information querying unit 210 searches the flash memory mapping table stored in flash memory for mapping information between logical addresses and physical addresses by executing a read operation on the system area of the flash memory when the main computing system is booted.

In this case, if the mapping information storage management unit 140 has stored the mapping information of the FTL mapping table intactly in the flash memory, the mapping information of the flash memory mapping table includes the start logical address, the start physical address corresponding to the start logical address, and the size of sequential data.

Otherwise, if the mapping information storage management unit 140 has reconstructed the mapping information of the FTL mapping table and stored the reconstructed mapping information in the flash memory, the mapping information of the flash memory mapping table includes one-to-one page mapping information between the logical addresses and the physical addresses.

The detection unit 220 detects sequential logical addresses and sequential physical addresses corresponding to the sequential logical addresses, based on the mapping information of the flash memory mapping table, which was retrieved by the mapping information querying unit 210.

Using the size indicated by the sequential logical addresses and the sequential physical addresses, which are detected by the detection unit 220, the mapping information management unit 230 stores more condensed mapping information including the start logical address, the start physical address corresponding to the start logical address, and the size of sequential data in the memory of the flash translation layer.

In this case, the condensed mapping information stored in the memory of the flash translation layer is mapping information generated by the processes of: determining whether the logical addresses and physical addresses of the current entry and the next entry are sequential, using the mapping information of the flash memory mapping table retrieved by the detection unit 220; and condensing the current entry and the next entry into a single entry when the logical addresses and physical addresses of the current entry and the next entry are sequential. The mapping information management unit 230 manages mapping information stored in the memory (DRAM) of the flash translation layer.

Hitherto, the system of the present invention has been simply described with reference to FIGS. 1 and 2. Hereinafter, the present invention will be described in detail by steps.

Figure 3:
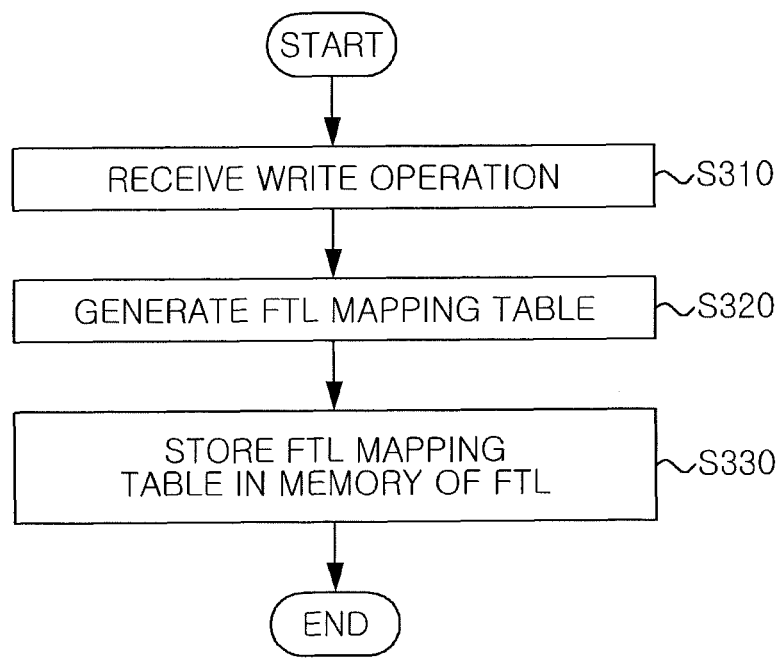
FIG. 3 is a flowchart illustrating a process for managing mapping information in a flash translation layer when a write operation is received, according to an embodiment of the present invention.

FIG. 3 is a flowchart illustrating a process for managing mapping information in a flash translation layer when a write operation is received, according to an embodiment of the present invention.

Step S310 is a step for receiving a write operation. Referring to FIG. 1, the write operation reception unit 110 receives a write operation from a file system at this step.

Step S320 is a step for generating an FTL mapping table, and the condensed mapping information generation unit 120 generates condensed mapping information using the data size of the write operation received by the write operation reception unit 110 and the start logical address of sequentially allocated logical addresses of the write operation.

Step S330 is a step for storing mapping information in the memory of the flash translation layer, and the condensed mapping information generated at step S320 is stored as an FTL mapping table in the memory 130 of the flash translation layer.

For example, suppose that an operation, "W, LSN 0, 128: write 128 sectors at start logical sector 0" is executed in a file system. If one page contains 8 sectors, a conventional page-level mapping method writes a total of 16 entries by a page unit, such as (logical page 0, physical page 0), (logical page 1, physical page 1), (logical page 2, physical page 2), . . . , (logical page 15, physical page 15), to the page mapping table.

Such a conventional page mapping method causes the size of the page mapping table to become large, thus degrading performance when a main computing system is booted.

In the present invention, the condensed mapping information generation unit 120 condenses the mapping information. Specifically, when the data stored in flash memory is not attribute data but user data having a large size of data, condensed mapping information is generated using a start logical address, a start physical address corresponding to the start logical address, and the data size of the write operation, calculated by a page unit, rather than writing the addresses of all the pages.

In other words, when the write operation reception unit 110 receives "W, LSN 0, 128", from a file system at step S310, the condensed mapping information generation unit 120 generates mapping information, which is condensed into (logical page 0, physical page 0, 16), at step S320. The FTL memory 130 stores therein the condensed information, that is, (logical page 0, physical page 0, 16) at step S330.

Figure 6:
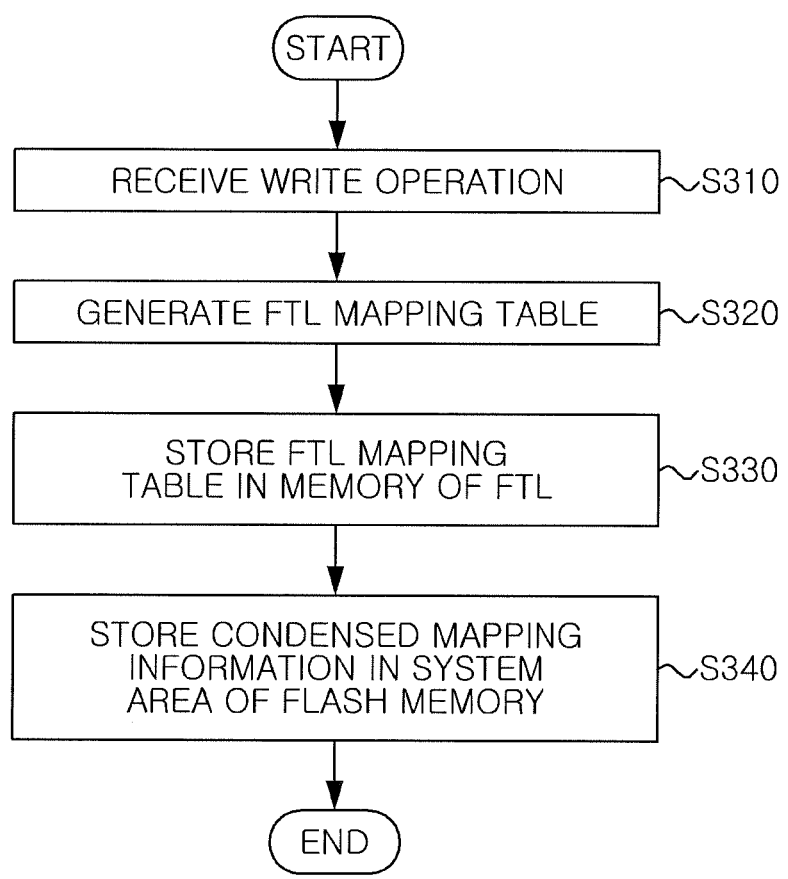
FIG. 6 is a flowchart illustrating a process for storing mapping information from a flash translation layer into flash memory when a write operation is received, according to another embodiment of the present invention.

FIG. 6 is a flowchart illustrating a process in which mapping information from a flash translation layer is stored into flash memory when a write operation is received, according to another embodiment of the present invention.

Figure 7:
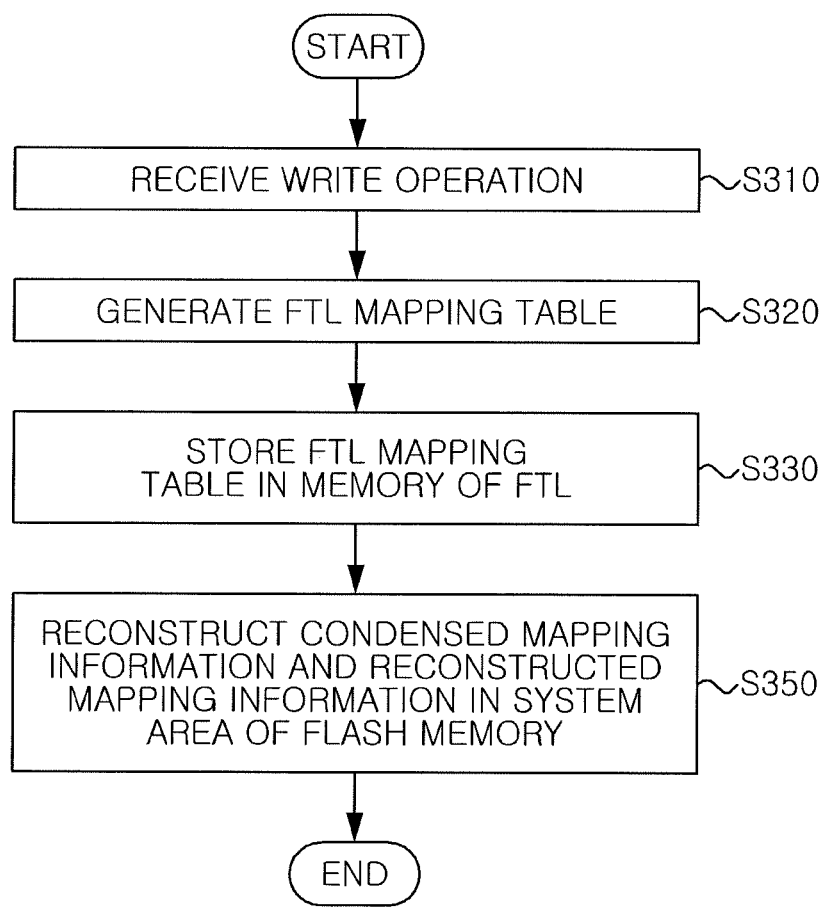
FIG. 7 is a flowchart illustrating a process for storing mapping information from a flash translation layer into flash memory when a write operation is received, according to a further embodiment of the present invention.

FIG. 7 is a flowchart illustrating a process in which mapping information from a flash translation layer is stored into flash memory when a write operation is received, according to a further embodiment of the present invention.

Referring to FIGS. 6 and 7, the mapping information storage management unit 140 stores the flash memory mapping table, generated based on the FTL mapping table stored in the FTL memory 130, in the system area of the flash memory at step S340 or S350. The mapping information storage management unit 140 stores the mapping information (FTL mapping table), which has been stored in the memory 130 of the flash translation layer, in the system area of the flash memory before the operation of the flash memory is terminated, or may periodically store the FTL mapping table as the flash memory mapping table in the system area of the flash memory at step S340 or S350 to prevent data loss that may be caused when the system power is unexpectedly interrupted.

Referring to FIG. 6, according to an embodiment of the present invention, the mapping information storage management unit 140 may store the condensed form of FTL mapping table intactly as a flash memory mapping table in the system area of the flash memory at step S340. Also, referring to FIG. 7, according to another embodiment of the present invention, the mapping information storage management unit 140 may generate a flash memory mapping table including one-to-one mapping information of each of the pages by reconstructing the condensed form of FTL mapping table, and store the flash memory mapping table in the system area of the flash memory at step S350.

In the case of step S340, the flash memory mapping table includes the start logical address, the start physical address corresponding to the start logical address, and the data size of the write operation, calculated by a page unit. In the case of step S350, the flash memory mapping table includes one-to-one page mapping information between logical page addresses and physical page addresses.

In the case of step S340, the flash memory mapping table has a condensed format, which is different from that of the conventional art, thus the data structure of flash memory may be different from that of the conventional art in order to implement step S340. However, in the case of step S350, the present invention focuses on the process for condensing the mapping information in the flash translation layer memory 130, and the mapping table stored in the flash memory has a structure identical to that of the conventional art. In other words, the present invention is applied not only to the case in which the data structure of flash memory is changed to be suitable for the condensed mapping information, but also to the case in which the flash memory mapping information and the flash memory data structure of the conventional art are used.

Figure 4:
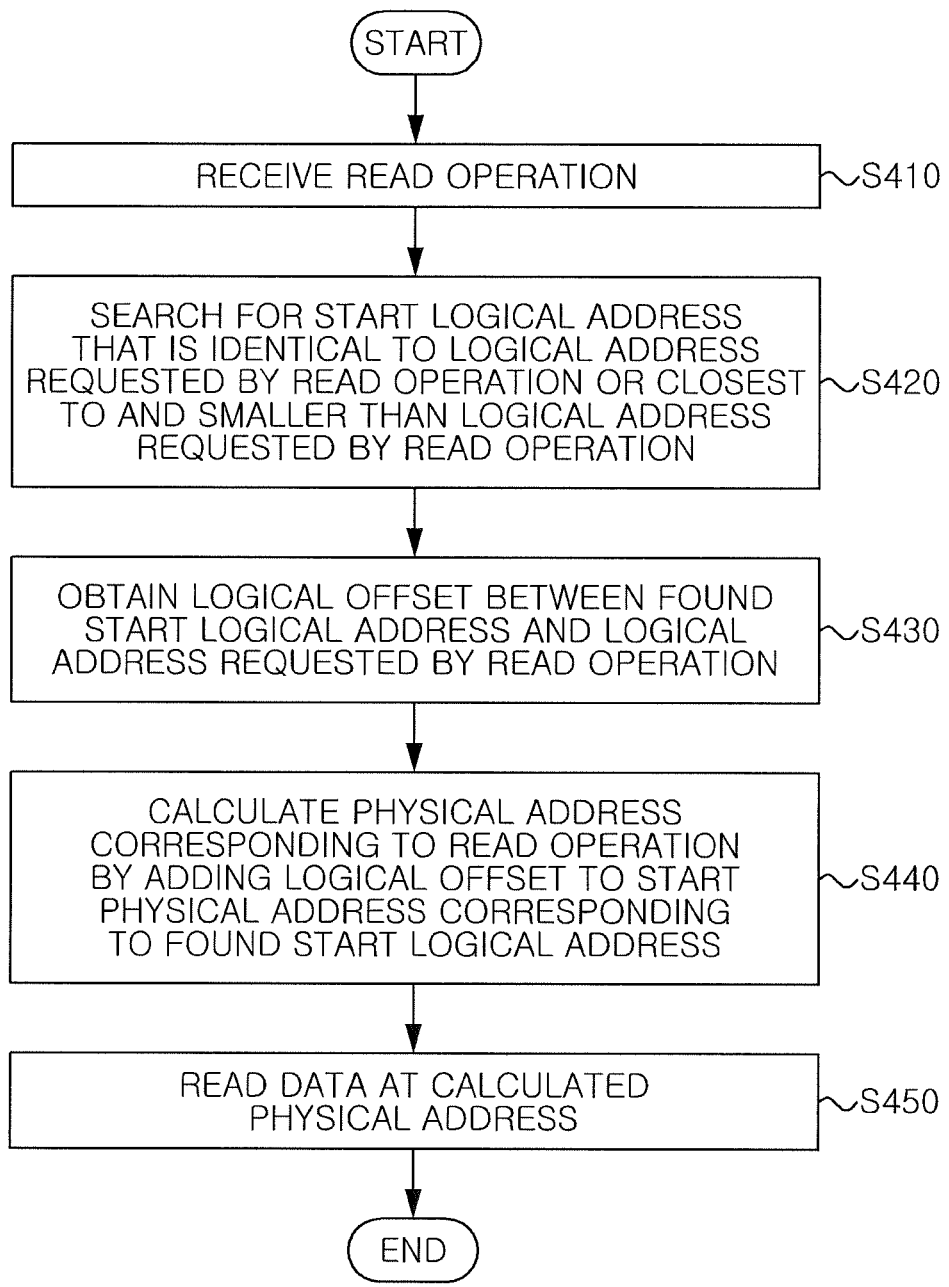
FIG. 4 is a flowchart illustrating a process for executing a read operation on condensing mapping information, according to an embodiment of the present invention.

FIG. 4 is a view illustrating a read operation process according to an embodiment of the present invention. In the embodiment of FIG. 4, each step for the read operation is described on the assumption that an FTL mapping table has been stored in the memory of the flash translation layer.

Because logical addresses for the large size of user data are sequentially allocated, physical addresses for storing the user data in the flash memory are also sequentially allocated. Therefore, physical pages may be retrieved depending on offsets.

At step S410, the read operation reception unit 150 receives a read operation from a file system.

At step S420, the FTL mapping table is searched for a start logical address, which is identical to a logical address requested by the read operation received at step S410 or is the closest to and smaller than the logical address requested by the read operation. Step S420 is executed by the search unit 160 based on the information stored in the FTL memory 130.

A logical offset between the start logical address found at step S420 and the logical address requested by the read operation is calculated at step S430. At step S440, a physical address corresponding to the read operation is calculated by adding the logical offset obtained at step S430 to the start physical address corresponding to the found start logical address. Steps S430 to S440 are executed by the calculation unit 170.

At step S450, a read operation is executed on the physical address calculated at step S440, and this step is executed by the read operation unit 180.

For example, suppose that a read operation, "R, LPN 0: perform a read operation on logical page 0." is received from a file system at step S410 and "(logical page 0, physical page 0, 16) has been stored in the memory (DRAM) of the flash translation layer.

At step S420, the logical address of the entry "(logical page 0, physical page 0, 16)" is found as a start logical address, which is identical to the logical address requested by the read operation received at step S410 or is the closest to and smaller than the logical address requested by the read operation.

At step S430, a logical offset between the start logical address (0) found at step S420 and the logical address (0) requested by the read operation is calculated, and the logical offset becomes "0" (logical page 0-logical page 0).

At step S440, a physical address is calculated by adding the logical offset (0) to the start physical address (0) corresponding to the found start logical address (0), and the calculated physical address becomes "0".

Therefore, the read operation unit 180 executes the read operation on the physical address "0" at step S450. Hereby, the read operation is terminated.

Hitherto, the described is the case in which condensed mapping information is stored using a start logical address, a start physical address corresponding to the start logical address, and the data size of the write operation, calculated by a page unit, rather than storing all the data, in order to reduce the size of an FTL mapping table.

Hereinafter, a technique for reducing the size of an FTL mapping table more in order to improve system boot performance of the present invention will be described, and this operation is called fast wake-up operation in this specification.

Figure 5:
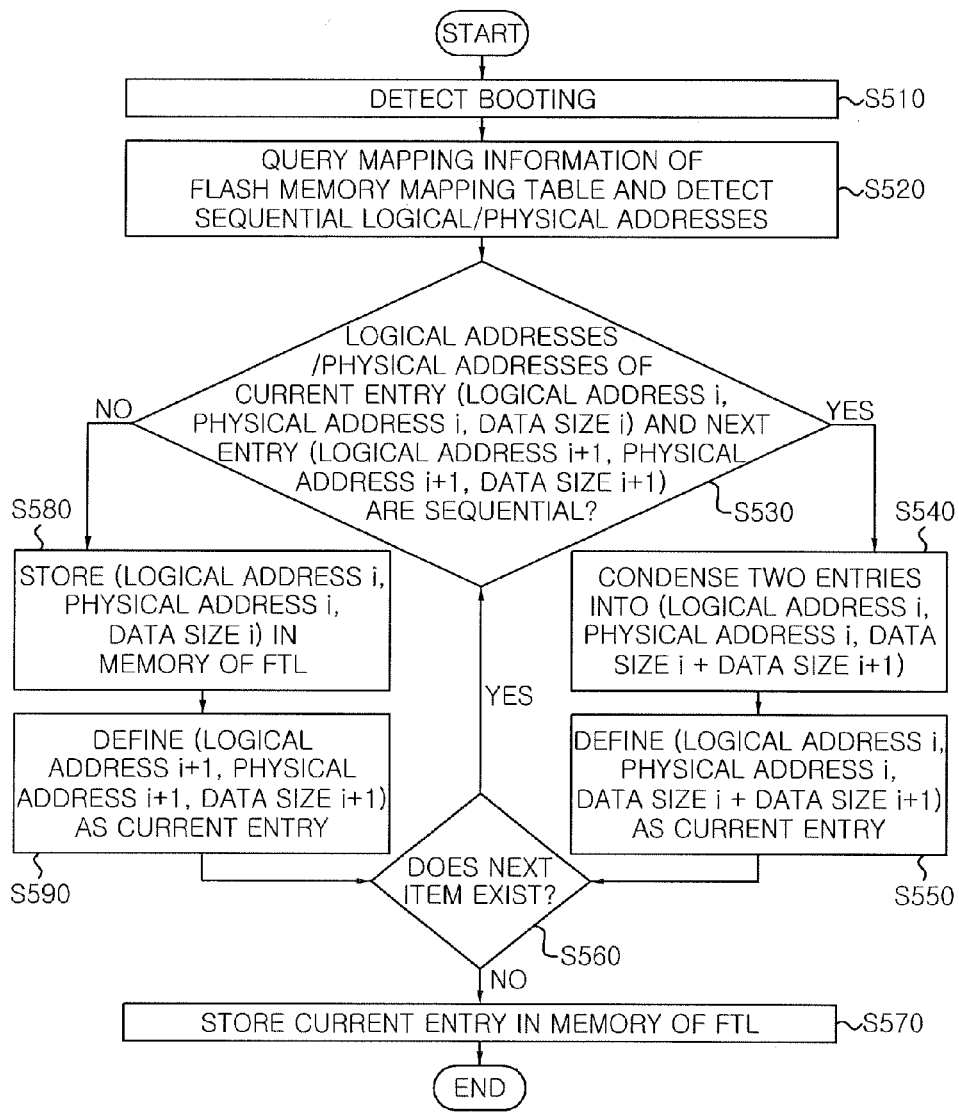
FIG. 5 is a flowchart illustrating a process for condensing mapping information and storing the mapping information in memory of a flash translation layer when a main computing system is booted, according to an embodiment of the present invention.

FIG. 5 is a view illustrating a process flow when a main computing system is booted, according to an embodiment of the present invention.

Referring to FIG. 5, step S520 is a step for querying the mapping information of a flash memory mapping table and for detecting sequential logical/physical addresses. When system booting is detected at step S510, the mapping information querying unit 210 executes a read operation on the system area of the flash memory, whereby the flash memory mapping table stored in the flash memory, which is the mapping information between logical addresses and physical addresses, is found. Then, the detection unit 220 detects sequential logical addresses and sequential physical addresses corresponding to the sequential logical addresses, based on the mapping information of the flash memory mapping table found by the mapping information querying unit 210.

In this case, if the condensed mapping information of the FTL is stored intactly in the mapping information storage management unit 140, the mapping information of the flash memory mapping table includes a start logical address, a start physical address corresponding to the start logical address, and the size of sequential data. If the mapping information of the FTL is not condensed and stored in the mapping information storage management unit 140, the mapping information of the flash memory mapping table includes one-to-one page mapping information between the logical addresses and the physical addresses.

Also, using the size indicated by the sequential logical addresses and the sequential physical addresses detected at step S520, the mapping information management unit 230 stores more condensed mapping information, which includes a start logical address, a start physical address, and the size of sequential data. The mapping information management unit 230 is present on the memory (DRAM) of the flash translation layer, and in this case, the mapping information stored in the memory of the flash translation layer is FTL mapping information in which the mapping information stored in the FTL memory 130 is condensed more.

The process for generating the more condensed mapping information will be described as follows.

At step S530, it is checked whether the logical addresses and the physical addresses of the current entry (logical address i, physical address i, data size i) and the next entry (logical address i+1, physical address i+1, data size i+1), detected at step S520, are sequential.

When the logical addresses and the physical addresses are sequential, the current entry and the next entry is condensed into (logical address i, physical address i, data size i+data size i+1) at step S540.

For example, when the current entry is (logical page 0, physical page 0, 16) and the next entry is (logical page 16, physical page 16, 16), it is determined at step S530 that the logical addresses are sequential because the current entry has pages from 0 to 15 and the next entry has pages from 16 to 31. Similarly, it is determined that physical addresses are also sequential because the current entry has pages from 0 to 15 and the next entry has pages from 16 to 31. Therefore, at step S540, the entries are condensed into (logical page 0, physical page 0, 32 (=16+16)).

At step S550, the information condensed at step S540, that is, "(logical page 0, physical page 0, 32)", is defined as a current entry.

Then, whether another entry exists after the current entry is determined at step S560, and when there is another entry, step S530 is executed again to compare the current entry and the next entry. Conversely, when there is no entry after the current entry, step S570 is executed to store the current entry in the memory of the flash translation layer. Namely, at step S570, (logical page 0, physical page 0, 32) is stored in the memory of the flash translation layer.

The above mentioned process enables more condensed mapping information to be stored in the memory (DRAM) of the flash translation layer by further condensing the mapping information stored in the flash memory when the logical addresses and physical addresses thereof are sequential, whereby system boot performance may be improved.

Meanwhile, when the logical addresses and the physical addresses are not sequential at step S530, the current entry, (logical address i, physical address i, data size i), namely, (logical page 0, physical page 0, 16) is stored in the memory of the flash translation layer at step S580.

At step S590, the next entry (logical address i+1, physical address i+1, data size i+1), namely, (logical page 16, physical page 16, 16) is defined as a current entry.

Then, whether another entry exists after the current entry is determined at step S560, and when there is another entry after the current entry, step S530 is executed again to compare the current entry and the next entry. Conversely, when there is no entry after the current entry, step S570 is executed to store the current entry in the memory of the flash translation layer. Namely, at step S570, (logical page 16, physical page 16, 16) is stored in the memory of the flash translation layer.

The present invention has been derived from research conducted as part of projects for supporting general researchers by the Ministry of Education, Science and Technology and the National Research Foundation of Korea [Project Management Number: 1345176071; Project Name: Research for system software supporting next-generation flash memory system].

The flash memory-based page-level address mapping method according to an embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

While the present invention has been described in conjunction with specific details, such as specific elements, and limited embodiments and diagrams above, these are provided merely to help an overall understanding of the present invention. The present invention is not limited to these embodiments, and various modifications and variations can be made based on the foregoing description by those having ordinary knowledge in the art to which the present invention pertains.

Accordingly, the technical spirit of the present invention should not be determined based on only the described embodiments, and the following claims, all equivalents to the claims and equivalent modifications should be construed as falling within the scope of the spirit of the present invention.

The present invention relates to a method and system for a page-level address mapping based on flash memory and, more particularly, to a method and system for improving system boot performance by decreasing the number of read operations by reducing the sizes of mapping information and a page mapping table, using sequential logical addresses and a data size.

A flash memory-based page-level address mapping method according to an embodiment of the present invention includes a step for receiving a read operation from the file system, a step for searching the FTL mapping table for a start logical address, which is identical to the logical address requested by the read operation or is the closest to and smaller than the logical address requested by the read operation, a step for calculating a physical address corresponding to the read operation, using the found start logical address and the logical address requested by the read operation, and the step for reading data stored at the calculated physical address of the flash memory.

What is claimed is:

1. A method for a page-level address mapping based on flash memory, comprising:
   receiving, by a processor, a write operation from a file system;
   generating, by the processor, condensed mapping information of the write operation from a plurality of information corresponding to a logical address of the write operation and a physical address of the write operation, based on a data size of the write operation, a start logical address of sequentially allocated logical addresses of the write operation and a start physical address corresponding to the start logical address;
   storing, by the processor, the condensed mapping information as a first mapping table in a memory of a flash translation layer;
   receiving, by the processor, a read operation from the file system;
   searching, by the processor, the first mapping table for a start logical address which is identical to a logical address requested by the read operation or is closest to and smaller than the logical address requested by the read operation;
   calculating, by the processor, a physical address corresponding to the read operation based on the searched start logical address and the logical address requested by the read operation; and
   reading, by the processor, data corresponding to the read operation stored at the calculated physical address of the flash memory.

2. The method of claim 1, wherein the storing the condensed mapping information is further configured to store the start logical address, the start physical address corresponding to the start logical address, and the data size of the write operation as the first mapping table, the data size of the write operation being calculated by a page unit.

3. The method of claim 1, further comprising,
   storing, by the processor, a second mapping table, generated based on the first mapping table, in a system area of the flash memory.

4. The method of claim 3, wherein the storing the second mapping table is further configured to store the second mapping table including the start logical address, the start physical address corresponding to the start logical address, and the data size of the write operation, the data size of the write operation being calculated by a page unit.

5. The method of claim 3, wherein the storing the second mapping table is comprising:

generating, by the processor, the second mapping table including one-to-one page mapping information between logical page addresses and physical page addresses based on the first mapping table, and
storing, by the processor, the second mapping table in the system area of the flash memory.

6. The method of claim 1, wherein the calculating the physical address corresponding to the read operation comprises:
   calculating, by the processor, a logical offset between the searched start logical address and the logical address requested by the read operation; and
   calculating, by the processor, the physical address corresponding to the read operation by adding the logical offset to a start physical address corresponding to the searched start logical address.

7. A method for a page-level address mapping based on flash memory, comprising:
   querying, by a processor, first mapping information between logical addresses and physical addresses by executing a read operation on a system area of the flash memory when the system is booted;
   detecting, by the processor, sequential logical addresses and sequential physical addresses corresponding to the sequential logical addresses, based on the found first mapping information; and
   storing, by the processor, second mapping information including a start logical address, a start physical address corresponding to the start logical address, and a size of sequential data information in memory of a flash translation layer, based on a size indicated by the detected sequential logical addresses and the detected sequential physical addresses,
   wherein the detecting the sequential logical addresses and the sequential physical addresses is further configured to determine whether logical addresses and physical addresses of a current entry and a next entry of the found first mapping information are sequential, and
   wherein the storing the second mapping information is further configured to generate condensed second mapping information by condensing the current entry and the next entry into a single entry when the logical addresses and the physical addresses of the current entry and the next entry are sequential.

8. The method of claim 7, wherein the first mapping information includes the start logical address, and the size of sequential data information.

9. The method of claim 7, wherein the second mapping information includes one-to-one page mapping information between the logical addresses and the physical addresses.

10. A system for a page-level address mapping based on flash memory, comprising:
    a processor configured to:
    receive a write operation from a file system;
    generate condensed mapping information of the write operation from a plurality of information corresponding to a logical address of the write operation and a physical address of the write operation, based on a data size of the write operation, start logical address of sequentially allocated logical addresses of the write operation and a start physical address corresponding to the start logical address; and
    a memory of a flash translation layer, configured to store the condensed mapping information as a first mapping table, wherein the processor is further configured to:
receive a read operation from the file system;
search the first mapping table for a start logical address which is identical to a logical address requested by the read operation or is closest to and smaller than the logical address requested by the read operation;
calculate a physical address corresponding to the read operation based on the searched start logical address and the logical address requested by the read operation; and
read data corresponding to the read operation stored at the calculated physical address of the flash memory.

11. The system of claim 10, the processor is further configured to store a second mapping table, generated based on the first mapping table, in a system area of the flash memory.

12. The system of claim 11, the processor is further configured to store the second mapping table including the start logical address, a start physical address corresponding to the start logical address, and the size of the data information of the write operation, the size of the data information of the write operation being calculated by a page unit.

13. The system of claim 11, the processor is further configured to:
generate the second mapping table including one-to-one page mapping information between logical page addresses and physical page addresses based on the first mapping table; and
store the second mapping table in the system area of the flash memory.

14. A system for a page-level address mapping based on flash memory, comprising a processor configured to:
query first mapping information between logical addresses and physical addresses by executing a read operation on a system area of the flash memory when the system is booted;
detect sequential logical addresses and sequential physical addresses corresponding to the sequential logical addresses, based on the found first mapping information; and
store second mapping information including a start logical address, a start physical address corresponding to the start logical address, and a size of sequential data information in memory of a flash translation layer, based on a size indicated by the detected sequential logical addresses and the detected sequential physical addresses,
wherein the processor is further configured to:
determine whether logical addresses and physical addresses of a current entry and a next entry of the found first mapping information are sequential, and
generate condensed second mapping information by condensing the current entry and the next entry into a single entry when the logical addresses and the physical addresses of the current entry and the next entry are sequential.

* * * * *